Aug. 29, 1950     L. N. BRUTUS     2,520,122
LOCK NUT
Filed May 25, 1949

INVENTOR
LEE N. BRUTUS
BY
ATTORNEY

| Patented Aug. 29, 1950 | 2,520,122 |

UNITED STATES PATENT OFFICE 2,520,122

LOCK NUT

Lee N. Brutus, Los Angeles, Calif.

Application May 25, 1949, Serial No. 95,327

2 Claims. (Cl. 151—7)

This invention relates to lock nuts and has for an object to provide a lock nut having novel and improved characteristics.

Another object is to provide a lock nut which retains its locking characteristics after long continued and repeated use.

Another object is to provide a lock nut having a plastic locking element so disposed therein that no surface of the plastic element is exposed when the nut is in use.

Another object is to provide a lock nut having a plastic locking element disposed to maintain locking pressure during long continued use.

Another object is to provide a lock nut having a plastic plug disposed therein to maintain both axial and radial pressure on the nut in a direction to increase the frictional contact of the threads.

Another object is to provide novel and improved means for securing the plastic material in the nut.

Various other objects and advantages will be apparent as the nature of the invention is more fully disclosed.

Although the novel features which are characteristic of this invention are pointed out more particularly in the claims, the nature of the invention will be better understood by referring to the following description, taken in connection with the accompanying drawing, in which a specific embodiment thereof has been set forth for purposes of illustration.

Figure 1:
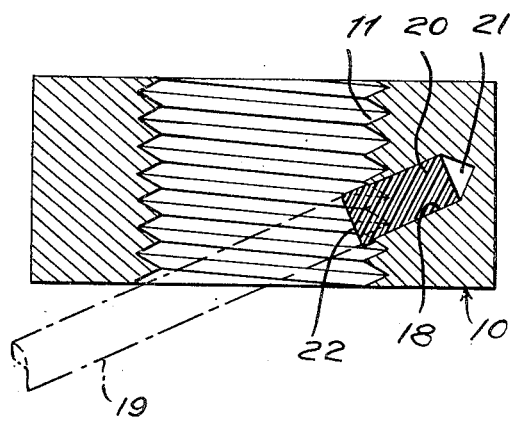
Fig. 1 is a longitudinal section through a nut showing the plastic plug in place.

In accordance with the present invention, I provide a small plug of a material which is capable of being deformed without taking a permanent set and which tends to return to its original shape gradually as distinguished from rubber-like compositions which return to their original shape as soon as the deforming pressure is removed. This plug is inserted in the inside of the nut from the bore thereof and extends at an angle to the axis of the nut in a direction to exert both a radial and an axial thrust. The radial thrust holds the threads on the side opposite the plug in pressure contact and the axial thrust is exerted in the direction toward the point of the bolt to increase and maintain the pressure on the threads when the nut is set in clamping contact with the work piece with the bolt under tension.

I have found that nylon is particularly suited for this purpose. Nylon is hard, but may be deformed by the pressure of the threads and has the property of tending to return to its original shape after being deformed. It does not take a permanent set and maintains its locking characteristics even after being repeatedly re-used. The thread is pressed rather than cut into the surface of the nylon plug by the engaged thread and the tendency of the nylon plug to return to its original shape maintains a pressure against the engaged thread which produces a permanent locking effect.

Referring to the drawings a standard nut 10 is shown having internal threads 11 adapted to engage external threads 12 on a bolt 13 having a threaded shank 14 and a head 15.

In accordance with the present invention a hole 18 is drilled in the nut and extends from the threaded bore a part of the distance through the nut wall at an angle to the axis of the nut. The hole 18 may be conveniently drilled by inserting a drill at an angle into the threaded bore of the nut from one side as indicated by the dash lines 19 in Fig. 1.

The nylon plug 20 is preferably cut from a rod having a diameter slightly greater than that of the hole 18. This plug 20 is pressed or extruded through a reducing die to a size to fit within the hole 18. The plug thus tends to expand to its original size and thus seats securely in the hole 18. This action is aided by the drilling operation which heats the nut and causes the same to expand. The nut contracts on cooling and thus exerts a further gripping action on the plug.

The ends of the plug 20 are preferably cut flat, as shown in Fig. 1, and at a right angle to the axis thereof and the plug is inserted a distance to leave an expansion space 21 beyond the inner end thereof.

Figure 2:
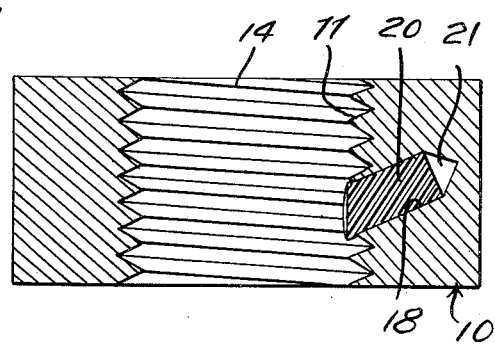
Fig. 2 is a similar section showing the plug after its outer surface has been cut or ground parallel to the threads.

After the plug 20 has been inserted as indicated in Fig. 1, the outer end 22 thereof is cut or ground off by a suitable tool parallel with the tops of the threads 11, as shown in Fig. 2. The nut is then ready for shipment or use.

Figure 3:
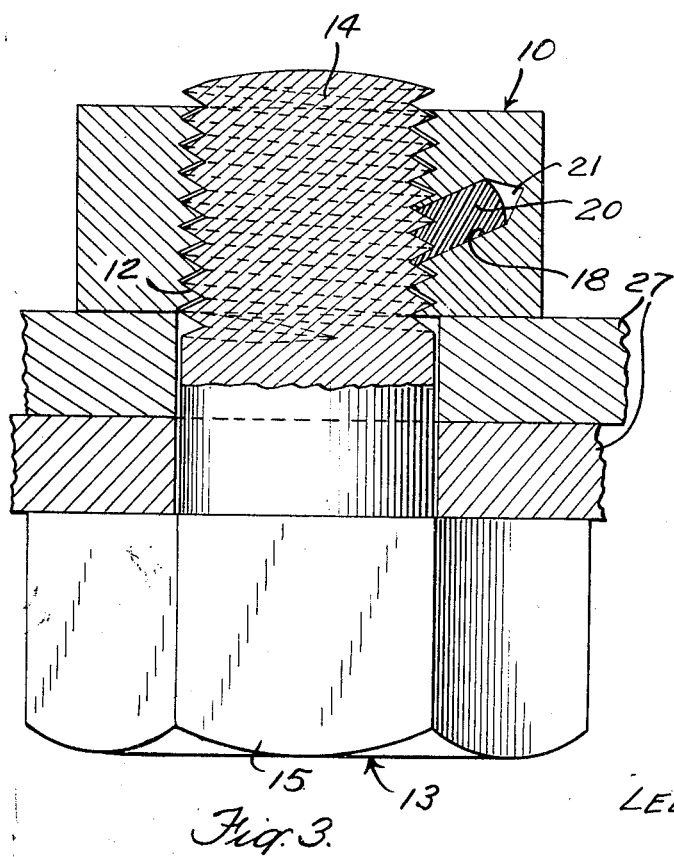
Fig. 3 is a longitudinal section through a bolt and nut showing the plug after it has been deformed by the bolt threads.

When this nut is placed on an externally threaded bolt, as shown in Fig. 3, the external thread 12 of the bolt 13 compresses the top surface of the plug 20 to cause the same to conform to the shape of the threads 12 and in so doing displaces the inner end of the plug into the expansion space 21. The air pressure thus built up in the space 21, the resilience of the plug 20, and the natural tendency of the plug 20 to return to its initial shape causes the plug to exert a substantial pressure upon the threads 12 of the bolt 13 which pressure is maintained throughout the period of use of the nut.

The space 21 also provides space for the thermal expansion of the plug 20, which may have a coefficient of expansion several times that of the metal shank 12. Without this space, if the nut were applied at elevated temperatures the threads 12 would shear or cut the plug instead of compressing the same and when cool the plug would become loose in the hole 18 thereby losing its locking effect and also preventing its re-use.

Figure 4:
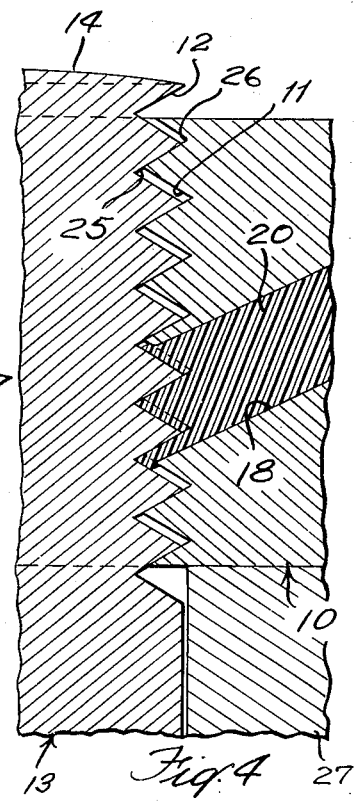
Fig. 4 is an enlarged detail view showing the thread clearance exaggerated.

Since the plug extends at an angle to the axis of the nut it exerts pressure in a direction having an axial and a radial component. The radial component serves to maintain the threads on the opposite side of the bolt and nut in pressure contact. The axial component is exerted in the same direction as the compressive force due to the tightening of the nut. Both forces are restrained by the engaging sides of the threads. In the embodiment of Figs. 3 and 4 the downwardly inclined surface 25 of the inner thread 12 and the upwardly inclined surface 26 of the outer thread 11 oppose the thrust on the nut due to the reaction of the work pieces 27 which are clamped between the nut 10 and the head 15 and the thrust exerted by the plug 20 on the nut. Hence, if the pressure of the work pieces should be reduced, as by vibration of the parts, the thrust is maintained by the plug 20 so that the thread surfaces do not lose their pressure contact. Hence the tendency for the nut to work loose is eliminated.

Since the plug is entirely enclosed, it is unaffected by the external atmosphere. In addition, the completely enclosed space holds the plug under compression against the cushion of the air in space 21 regardless of temperature changes and the plug always tends to return to its original shape.

Although specific embodiments of the invention have been shown and described for purposes of illustration, it is to be understood that the invention is capable of various uses and that changes and modifications may be made therein as will be readily apparent to a person skilled in the art. The invention is only to be limited in accordance with the scope of the following claims.

What is claimed is:

1. A fastener comprising a nut having an integral peripheral wall and an internally screw-threaded bore adapted to engage an externally screw-threaded portion of a shank, said peripheral wall having a recess in one side only thereof, said recess having a cylindrical side wall and a closed bottom wall and extending from said bore through the threads thereof a part of the distance only through said peripheral wall at an angle such that the projection of the recess extends through the end of said bore whereby the recess is drillable by a tool inserted in said bore, and a plug of a deformable material having the property of not acquiring a permanent set but of returning gradually to its original shape after being deformed, said plug being secured in said recess with its top surface extending above the bottom of said threads so as to be deformed by the engaging thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said engaging thread, the top surface of said plug being completely covered by said engaging thread when said elements are in use.

2. A fastener comprising a nut having an integral peripheral wall and an internally screw-threaded bore adapted to engage an externally screw-threaded portion of a shank, said peripheral wall having a recess in one side only thereof, said recess having a cylindrical side wall and a closed bottom wall and extending from said bore through the threads thereof a part of the distance only through said peripheral wall at an angle such that the projection of the recess extends through the end of said bore whereby the recess is drillable by a tool inserted in said bore, and a plug of a deformable material having the property of not acquiring a permanent set but of returning gradually to its original shape after being deformed, said plug being normally of a diameter larger than said recess and being secured in said recess under compression with its top surface extending above the bottom of said threads so as to be deformed by the engaging thread of said second element for exerting locking pressure thereon, the bottom wall of said recess and the bottom of said plug having engaging portions forming a stop to limit the inward movement of said plug during assembly and having other portions spaced to form an expansion space adapted to receive the bottom of said plug when the latter is deformed by said engaging thread, the top surface of said plug being completely covered by said engaging thread when said elements are in use.

LEE N. BRUTUS.

No references cited.